United States Patent
Otsuki et al.

(10) Patent No.: US 11,436,941 B2
(45) Date of Patent: Sep. 6, 2022

(54) SUPPORT MOTION MEASUREMENT SYSTEM, REHABILITATION SUPPORT SYSTEM, SUPPORT MOTION MEASUREMENT METHOD, AND PROGRAM

(71) Applicant: TOYOTA JIDOSHA KABUSHIKI KAISHA, Toyota (JP)

(72) Inventors: Nobuhisa Otsuki, Toyota (JP); Issei Nakashima, Toyota (JP); Manabu Yamamoto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 170 days.

(21) Appl. No.: 16/890,179

(22) Filed: Jun. 2, 2020

(65) Prior Publication Data
US 2021/0005105 A1    Jan. 7, 2021

(30) Foreign Application Priority Data
Jul. 1, 2019   (JP) .............................. JP2019-123129

(51) Int. Cl.
*G09B 19/00*     (2006.01)
*A63B 71/06*     (2006.01)
(Continued)

(52) U.S. Cl.
CPC .......... *G09B 19/003* (2013.01); *A61H 1/024* (2013.01); *A61H 3/008* (2013.01);
(Continued)

(58) Field of Classification Search
CPC ............ A63B 24/0062; A63B 24/0075; A63B 71/0622; A63B 2024/0065; A63B 2024/0068; A63B 2024/0096; A63B 2071/0625; A63B 2071/0636; A63B 2071/065; A63B 2071/0694; A63B 2220/05; A63B 2220/806; A63B 2225/20;
(Continued)

(56) References Cited

U.S. PATENT DOCUMENTS

2015/0294481 A1   10/2015   Sakaue
2015/0342820 A1   12/2015   Shimada et al.
(Continued)

FOREIGN PATENT DOCUMENTS

| CN | 109846677 A | 6/2019 |
|---|---|---|
| JP | 2014-155693 A | 8/2014 |
| JP | 2015-223294 A | 12/2015 |

*Primary Examiner* — Jeffrey S Vanderveen
(74) *Attorney, Agent, or Firm* — Oliff PLC

(57) ABSTRACT

A walking training apparatus is a support motion measurement system for measuring a support motion performed for a training motion of a trainee by a training staff member assisting the trainee to perform training of a preset motion. The support motion measurement system includes a training motion detection unit, a support motion detection unit, and an identification unit. The training motion detection unit detects the training motion. The support motion detection unit detects at least one of a timing, a position, a direction and strength of the support motion received by the trainee from the training staff member in the training motion. The identification unit identifies the support motion for the training motion based on a motion pattern of the training motion.

15 Claims, 12 Drawing Sheets

(51) Int. Cl.
*A61H 3/00* (2006.01)
*A63B 22/02* (2006.01)
*A63B 21/00* (2006.01)
*A61H 1/02* (2006.01)
*A63B 22/00* (2006.01)

(52) U.S. Cl.
CPC .......... *A63B 21/4035* (2015.10); *A63B 22/02* (2013.01); *A63B 71/0622* (2013.01); *A63B 2022/0094* (2013.01); *A63B 2071/0694* (2013.01); *A63B 2220/807* (2013.01); *A63B 2220/836* (2013.01)

(58) Field of Classification Search
CPC . A63B 2225/50; A63B 2225/52; G06F 3/167; G06T 13/40; G06V 40/23; G06V 20/46; G06V 20/48
See application file for complete search history.

(56) References Cited

U.S. PATENT DOCUMENTS

| | | |
|---|---|---|
| 2019/0160337 A1 | 5/2019 | Otsuki et al. |
| 2020/0289894 A1* | 9/2020 | Shintani ............. A63B 24/0087 |
| 2022/0047444 A1* | 2/2022 | Walsh ....................... B25J 9/14 |

* cited by examiner

SUPPORT MOTION MEASUREMENT SYSTEM, REHABILITATION SUPPORT SYSTEM, SUPPORT MOTION MEASUREMENT METHOD, AND PROGRAM

CROSS REFERENCE TO RELATED APPLICATIONS

This application is based upon and claims the benefit of priority from Japanese patent application No. 2019-123129, filed on Jul. 1, 2019, the disclosure of which is incorporated herein in its entirety by reference.

BACKGROUND

The present disclosure relates to a support motion measurement system, a rehabilitation support system, a support motion measurement method, and a program.

A patient suffering from hemiplegia or the like may use a rehabilitation support system such as a walking training apparatus when performing rehabilitation for the purpose of relieving bad conditions. As an example of a walking training apparatus, a walking training apparatus including a walking assistance apparatus attached to a patient's leg who is a trainee to assist him/her to walk is disclosed (Japanese Unexamined Patent Application Publication No. 2015-223294).

In some cases, when a trainee performs rehabilitation, a trainee is accompanied by a training staff member such as a doctor or physical therapist (PT). The training staff member sets up the rehabilitation support apparatus and assists the trainee in setting up the rehabilitation support system.

SUMMARY

In order to effectively execute training using such a rehabilitation support apparatus, it is desirable that an assistance motion performed by a training staff member performed be appropriately performed. However, an assistance motion performed by a training staff member differs from person to person. For example, an effect of the assistance motion on the training may depend on the amount of experience of the training staff member. That is, a less experienced training staff member may not be able to perform the assistance motion appropriately.

The present disclosure has been made to solve such a problem. An object of the present disclosure is to provide a support motion measurement system and the like for reducing variations in a support motion.

An example aspect of the present disclosure is a support motion operation measurement system for measuring a support motion performed for a training motion of a trainee by a training staff member assisting the trainee to perform training of a preset motion. The support motion measurement system includes a training motion detection unit, a support motion detection unit, and an identification unit. The training motion detection unit is configured to detect the training motion. The support motion detection unit is configured to detect at least one of a timing, a position, a direction and strength of the support motion received by the trainee from the training staff member in the training motion. The identification unit is configured to identify the support motion for the training motion based on a motion pattern of the training motion.

Thus, the training staff member or the like can treat the support motion as objective data, for example, by classifying or stratifying the support motions according to the motion pattern of the trainee.

In the above support motion measurement system, the training motion detection unit may include an image pickup unit configured to capture an image of the trainee's body. Thus, the support motion measurement system can analyze the movement of the trainee's body and detect the motion pattern.

In the above support motion measurement system, the training motion detection unit may include an angle sensor attached to the trainee's body and configured to detect an angle of a joint of the trainee. Thus, the support motion measurement system can detect the motion pattern from a change of the angle of the joint.

In the above support motion measurement system, the training motion detection unit may include a pressure sensor attached to a part of the trainee's body and configured to detect at least one of a direction and strength of a force applied to the attached part. Thus, the support motion measurement system can detect the motion pattern from a change of the pressure sensor.

In the above support motion measurement system, the support motion detection unit may include an image pickup unit configured to capture an image of the training staff member's body. Thus, the support motion measurement system can estimate the support motion received by the trainee from the movement of the training staff member.

In the above support motion measurement system, the support motion detection unit may include an image pickup unit configured to capture an image of the trainee's body. Thus, the support motion measurement system can directly detect the support motion received by the trainee.

In the above support motion measurement system, the identification unit may be configured to identify the support motion based on a preset motion timing in the training motion, and the support motion measurement system may further include a statistical value calculation unit configured to calculate a statistical value of the support motion identified by the identification unit based on the motion timing. Thus, the support motion measurement system can calculate the statistical value of the support motion for each motion timing.

In the support motion measurement system, the training motion detection unit may be configured to detect the training motion in a walking motion performed by the trainee. Further, in the support motion measurement system, the identification unit may be configured to identify the support motion according to a walking cycle that is the motion pattern of the walking motion. Thus, the support motion measurement system can measure the support motion of the training staff member supporting the walking training of the patient suffering from hemiplegia or the like.

The above support motion measurement system may further include a support member for supporting at least a part of the trainee's upper body. The identification unit may be configured to associate whether or not the support member is supporting the trainee's upper body with the support motion and to identify the support motion based on the motion pattern. Alternatively, the above support motion measurement system may further include a support member for supporting at least a part of the trainee's upper body. The identification unit may be configured not to identify the support motion based on the motion pattern when the support member is supporting the trainee's upper body. Thus, the support motion measurement system can distinguish the measurement of the support motion not suitable for the measurement.

The support motion measurement system may further include a presentation unit configured to present the support motion identified by the identified unit to the trainee or the training staff member along the motion pattern. Thus, the support motion measurement system can make the training staff member and the like objectively recognize the support motion.

Another example aspect of the present disclosure is a rehabilitation support system that includes at least the above support motion measurement system; and a drive unit configured to support training of a motion performed by the trainee. The presentation unit is configured to associate the state of the training performed by driving the drive unit with the motion pattern and to present a change in the support motion. Thus, the rehabilitation support system can dynamically and objectively present the support motion for the training being performed.

Another example aspect of the present disclosure is a support motion measurement method for measuring a support motion performed for a training motion of a trainee by a training staff member assisting the trainee to perform training of a preset motion. The support motion measurement method includes a training motion detection step, a support motion detection step, and an identification step. The training motion detection step is for detecting the training motion. The support motion detection step is for detecting at least one of a timing, a position, a direction and strength of the support motion received by the trainee from the training staff member in the training motion. The identification step is for identifying a change in the support motion in the training motion according to a motion pattern of the training motion.

Thus, the training staff member or the like can treat the support motion as objective data, for example, by classifying or stratifying the support motions according to the motion pattern of the trainee.

Another example aspect of the present disclosure is a program for causing computer to execute a support motion measurement method for measuring a support motion performed for a training motion of a trainee by a training staff member assisting the trainee to perform training of a preset motion. The support motion measurement method includes a training motion detection step, a support motion detection step, and an identification step. The training motion detection step is for detecting the training motion. The support motion detection step is for detecting at least one of a timing, a position, a direction and strength of the support motion received by the trainee from the training staff member in the training motion. The identification step is for identifying a change in the support motion in the training motion according to a motion pattern of the training motion.

Thus, the training staff member or the like can treat the support motion as objective data, for example, by classifying or stratifying the support motions according to the motion pattern of the trainee.

According to the present disclosure, it is possible to provide a support motion measurement system and the like for reducing variations in a support motion.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Hereinafter, the present disclosure will be explained through embodiment of the present disclosure. However, they are not intended to limit the scope of the present disclosure according to the claims. Note that the same elements are denoted by the same reference signs throughout the drawings, and repeated description is omitted as necessary. Note that the same elements are denoted by the same reference signs throughout the drawings, and repeated description is omitted as necessary.

EMBODIMENT

Figure 1:
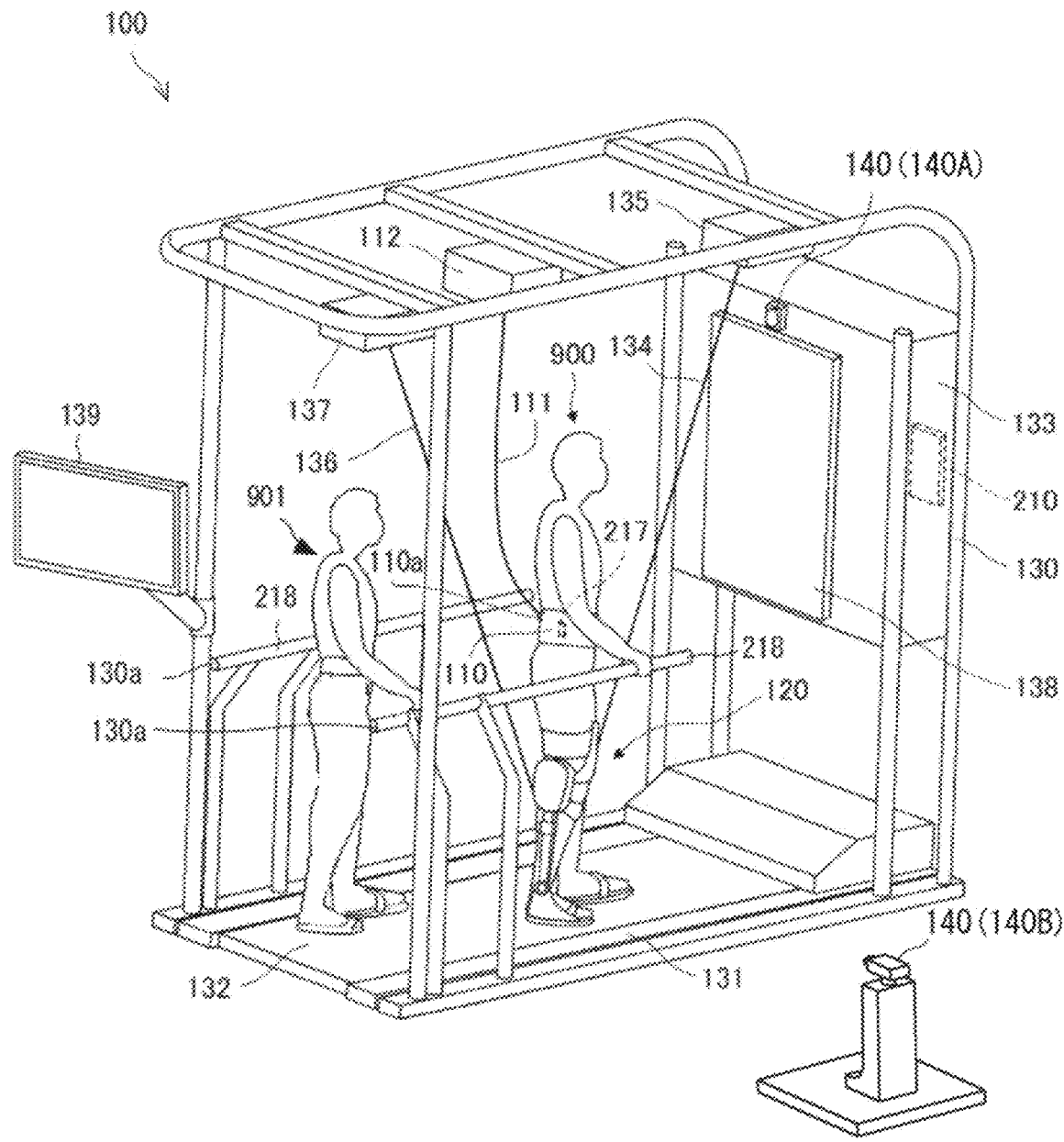
FIG. 1 is a schematic perspective view of a walking training apparatus.

An embodiment will be described hereinafter with reference to the drawings.
(System Configuration)
FIG. 1 is a schematic perspective view of a walking training apparatus 100 according to the embodiment. The walking training apparatus 100 is a motion support apparatus for supporting a user's motion. More specifically, the walking training apparatus 100 is a specific example of a rehabilitation support system or a rehabilitation support apparatus that supports rehabilitation performed by a trainee 900 who is the user. The walking training apparatus 100 is an apparatus by which the trainee 900, who is, for example, a hemiplegic patient suffering from paralysis in one of his/her legs, does walking training under the guidance of a training staff member 901. Note that the training staff member 901 can be a therapist (a physical therapist) or a doctor, and may also be referred to as a training instructor, a training assistant, a training supporter, or the like because he/she instructs the trainee in training or assists the trainee by giving assistance and the like.

The walking training apparatus 100 includes a function of measuring a support motion performed by the training staff member 901 when assisting rehabilitation. An apparatus or system including a function of measuring a support motion is referred to as a support motion measurement system. That is, the walking training apparatus 100 can also be referred to as a support motion measurement apparatus or a support motion measurement system.

The walking training apparatus 100 mainly includes a control panel 133 attached to a frame 130 forming an overall framework, a treadmill 131 on which the trainee 900 walks, and a walking assistance apparatus 120 attached to the diseased leg, i.e., the leg on the paralyzed side of the trainee 900.

The frame 130 is disposed in a standing position on the treadmill 131 mounted on the floor surface. The treadmill 131 rotates a ring-shaped belt 132 by using a motor (not shown). The treadmill 131 is an apparatus that prompts the trainee 900 to walk, and the trainee 900, who does a walking training, gets on the belt 132 and tries walking in accordance with the movement of the belt 132. Note that the training staff member 901 can stand on the belt 132 behind the trainee 900 and walk together as shown in FIG. 1. However, the training staff member 901 may typically be in a state in which he/she can easily assists the trainee 900 such as standing with his/her feet on both sides of the belt 132.

The frame 130 supports, for example, the control panel 133 that houses an overall control unit 210 that controls motors and sensors, and a training monitor 138 that is formed by, for example, a liquid-crystal panel and shows progress of the training and the like to the trainee 900. Further, the frame 130 supports a front pulling unit 135 roughly above and in front of the head of the trainee 900, supports a harness pulling unit 112 roughly above the head, and supports a rear pulling unit 137 roughly above and behind the head. Further, the frame 130 also includes handrails 130a that the trainee 900 grasps.

The handrails 130a are disposed on the left and right sides of the trainee 900. Each of the handrails 130a is orientated in a direction parallel to the walking direction of the trainee 900. The vertical position and the left/right position of the handrails 130a are adjustable. That is, the handrails 130a may include a mechanism for changing its height. Further, the handrails 130a can be configured so that their inclination angles can be changed by, for example, adjusting the heights of their front sides and the rear sides in the walking direction to different heights. For example, the handrails 130a can have an inclination angle so that their heights gradually increase along the walking direction. By grasping the handrail 130a, the trainee 900's upper body is supported. That is, the handrail 130a can be regarded as a support member that supports at least a part of an upper body.

Further, each of the handrails 130a is equipped with a handrail sensor 218 that detects a load (e.g., a pressure) received from the trainee 900. For example, the handrail sensor 218 may be a resistance change detection-type load detection sheet in which electrodes are arranged in a matrix pattern. Further, the handrail sensor 218 may be a six-axis sensor in which a three-axis acceleration sensor (x, y, z) is combined with a three-axis gyro sensor (roll, pitch, yaw). However, there is no particular limitation on the type of the handrail sensor 218 and the place where the handrail sensor 218 is disposed.

The camera 140 functions as an image pickup unit for observing the whole body of the trainee 900. The camera 140 is composed of a main camera 140A disposed near the training monitor 138 and positioned so as to face the trainee and a sub-camera 140B disposed to capture images of the trainee from the side. The camera 140 takes still images and moving images of the trainee 900 during the training. The camera 140 includes a set of a lens and an image pickup device so that it has such an angle of view that it can shoot the whole body of the trainee 900. The image pickup device is, for example, a CMOS (Complementary Metal-Oxide-Semiconductor) image sensor, and converts an optical image formed on an image forming surface into an image signal.

By the coordinated operation of the front pulling unit 135 and the rear pulling unit 137, the load of the walking assistance apparatus 120 is cancelled so that it does not become a load on the diseased leg. Further, the swinging motion of the diseased leg is assisted according to the set level.

One end of a front wire 134 is connected to a winding mechanism of the front pulling unit 135 and the other end thereof is connected to the walking assistance apparatus 120. The winding mechanism of the front pulling unit 135 winds or pays out the front wire 134 according to the motion of the diseased leg by turning on/off a motor (not shown). Similarly, one end of a rear wire 136 is connected to the winding mechanism of the rear pulling unit 137 and the other end thereof is connected to the walking assistance apparatus 120. The winding mechanism of the rear pulling unit 137 winds or pays out the rear wire 136 according to the motion of the diseased leg by turning on/off a motor (not shown). By the coordinated operation of the front pulling unit 135 and the rear pulling unit 137 as described above, the load of the walking assistance apparatus 120 is cancelled so that it does not become a load on the diseased leg. Further, the swinging motion of the diseased leg is assisted according to the set level.

For example, the training staff member 901, who serves as an operator, increases the set assistance level for a trainee who suffers from severe paralysis. When the assistance level is set to a large value, the front pulling unit 135 winds the front wire 134 with a relatively large force according to the timing of the swinging of the diseased leg. When the training has progressed and the assistance is no longer required, the training staff member 901 sets the assistance level to the minimum value. When the assistance level is set to the minimum value, the front pulling unit 135 winds the front wire 134 according to the timing of the swinging of the diseased leg with a force by which only the weight of the walking assistance apparatus 120 itself is cancelled.

The walking training apparatus 100 includes a fall-prevention harness apparatus as a safety apparatus, which includes, as its main components, a harness 110, a harness wire 111, and a harness pulling unit 112. The harness 110 is a belt that is wound around the abdomen of the trainee 900 and is fixed to his/her waist by, for example, a hook-and-loop fastener. The harness 110 includes a connection hook 110a that connects one end of the harness wire 111, which serves as a hoisting tool, to the harness 110, and may be referred to as a hanger belt. The trainee 900 attaches the harness 110 to his/her diseased leg so that the connection hook 110a is positioned in the rear part of the diseased leg.

One end of the harness wire 111 is connected to the connection hook 110a of the harness 110 and the other end thereof is connected to a winding mechanism of the harness pulling unit 112. The winding mechanism of the harness pulling unit 112 winds or pays out the harness wire 111 by turning on/off a motor (not shown). By the above-described configuration, when the trainee 900 is about to fall down, the fall-prevention harness apparatus winds the harness wire 111 according to an instruction from the overall control unit 210, which has detected the falling-down movement of the trainee 900, and thereby supports the upper body of the trainee 900 by the harness 110, so that the trainee 900 is prevented from falling down.

The harness 110 includes a posture sensor 217 for detecting the posture of trainee 900. The posture sensor 217 is, for example, a combination of a gyro sensor and an acceleration sensor, and outputs an inclination angle of the abdomen, to which the harness 110 is attached, with respect to the direction of gravity.

A management monitor 139 is attached to the frame 130 and serves as a display/input device by which the training staff member 901 or the like monitors and operates the rehabilitation support system. The management monitor 139 is formed by, for example, a liquid crystal panel. Further, a touch panel is disposed over its surface. The management monitor 139 displays various menu items related to the training setting, various parameter values during the training, training results, and so on.

The walking assistance apparatus 120 is attached to the diseased leg of the trainee 900 and assists the trainee 900 in walking by reducing the load of the extension and flexion at the knee joint of the diseased leg. The walking assistance apparatus 120 includes a sensor or the like that measures the load (e.g., the pressure) on the sole of the foot, and outputs various data related to the moving leg to the overall control unit 210. Further, the harness 110 can be connected to the walking assistance apparatus 120 by using a connection member (hereinafter referred to as a hip joint) including a rotation part. Details of the walking assistance apparatus 120 will be described later.

In this embodiment, the terms "leg" and "leg part" are used to refer to the entire part of the leg below the hip joint, and the terms "foot" and "foot part" are used to refer to a part of the leg from the ankle to the toe.

Figure 2:
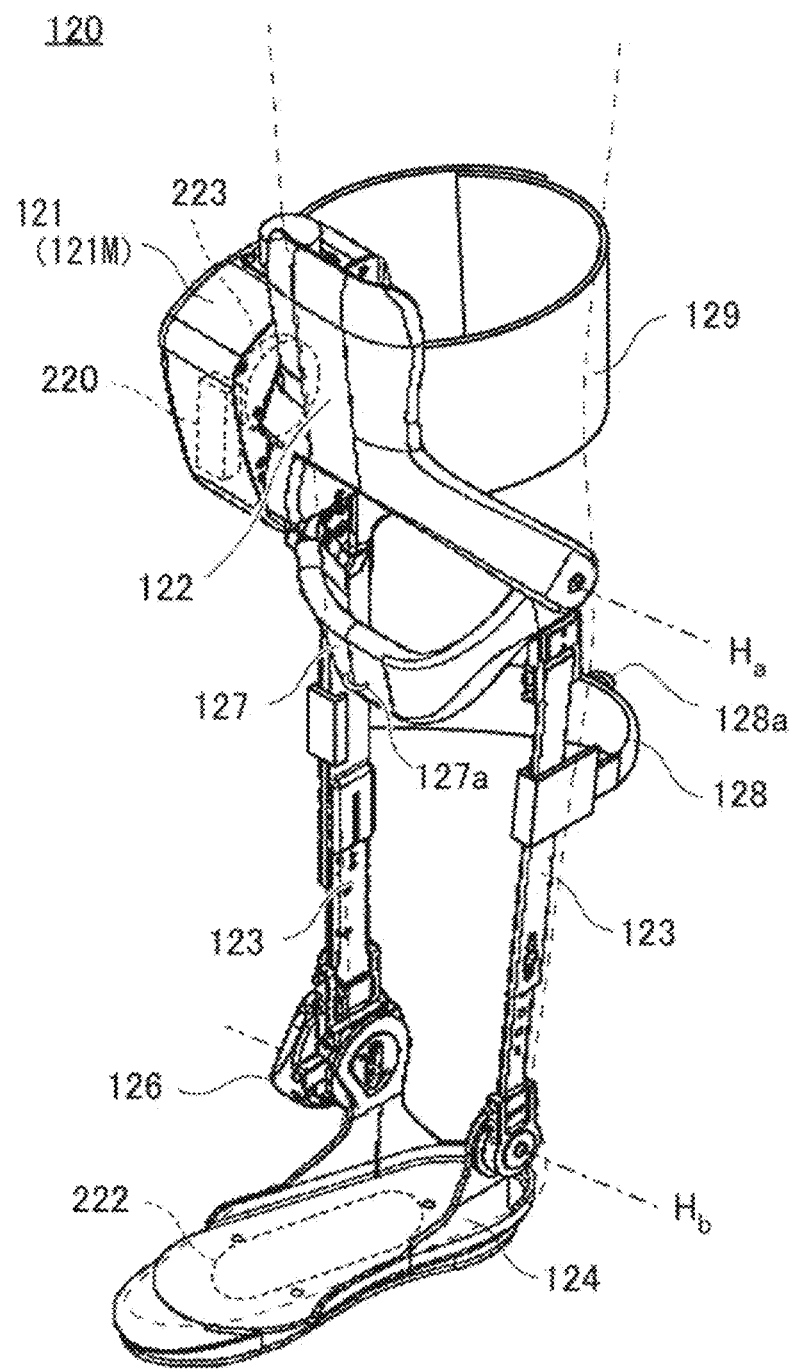
FIG. 2 is a schematic perspective view of the walking assistance apparatus.

Next, the walking assistance apparatus 120 will be described with reference to FIG. 2. FIG. 2 is a schematic perspective view showing an example of a configuration of the walking assistance apparatus 120. The walking assistance apparatus 120 mainly includes a control unit 121, a plurality of frames that support each part of a diseased leg, and a load sensor 222 for detecting a load (e.g., a pressure) applied to the sole.

The control unit 121 includes an assistance control unit 220 that controls the walking assistance apparatus 120, and also includes a motor(s) (not shown) that generates a driving force(s) for assisting extending movements and flexing movements of the knee joint. The frames, which support each part of the diseased leg, includes an upper-leg frame 122 and a lower-leg frame 123 rotatably connected to the upper-leg frame 122. Further, the frames also include a sole frame 124 rotatably connected to the lower-leg frame 123, a front connection frame 127 for connecting a front wire 134, and a rear connection frame 128 for connecting a rear wire 136.

The upper-leg frame 122 and the lower-leg frame 123 rotate relative to each other around a hinge axis $H_a$ shown in the figure. A motor 121M of the control unit 121 rotates according to an instruction from the assistance control unit 220, and by doing so, force the upper-leg frame 122 and the lower-leg frame 123 to open relative to each other around the hinge axis $H_a$ or force them to close relative to each other. The angle sensor 223 housed in the control unit 121 is, for example, a rotary encoder and detects an angle between the upper-leg frame 122 and the lower-leg frame 123 around the hinge axis $H_a$. The lower-leg frame 123 and the sole frame 124 rotate relative to each other around a hinge axis $H_b$ shown in the figure. The angular range of their relative rotation is adjusted in advance by an adjustment mechanism 126.

The front connection frame 127 is disposed so as to extend in the left/right direction in front of the upper leg and is connected to the upper-leg frame 122 at both ends. Further, a connection hook 127a for connecting the front wire 134 is provided at or near the center of the front connection frame 127 in the left/right direction. The rear connection frame 128 is disposed so as to extend in the left/right direction behind the lower leg and is connected to the lower-leg frame 123 at both ends. Further, a connection hook 128a for connecting the rear wire 136 is provided at or near the center of the rear connection frame 128 in the left/right direction.

The upper-leg frame 122 includes an upper-leg belt 129. The upper-leg belt 129 is a belt integrally provided in the upper-leg frame and is wound around the upper leg of the diseased leg to fix the upper-leg frame 122 to the upper leg. In this way, the whole walking assistance apparatus 120 is prevented from being displaced from the leg of the trainee 900.

The load sensor 222 is a load sensor embedded in the sole frame 124. The load sensor 222 may be configured to detect a magnitude and a distribution of a vertical load (e.g., a vertical pressure) received by the sole of the trainee 900. For example, the load sensor 222 may be configured to detect a COP (Center Of Pressure) of the sole. The load sensor 222 is, for example, a resistance change detection-type load detection sheet in which electrodes are arranged in a matrix pattern.

Figure 3:
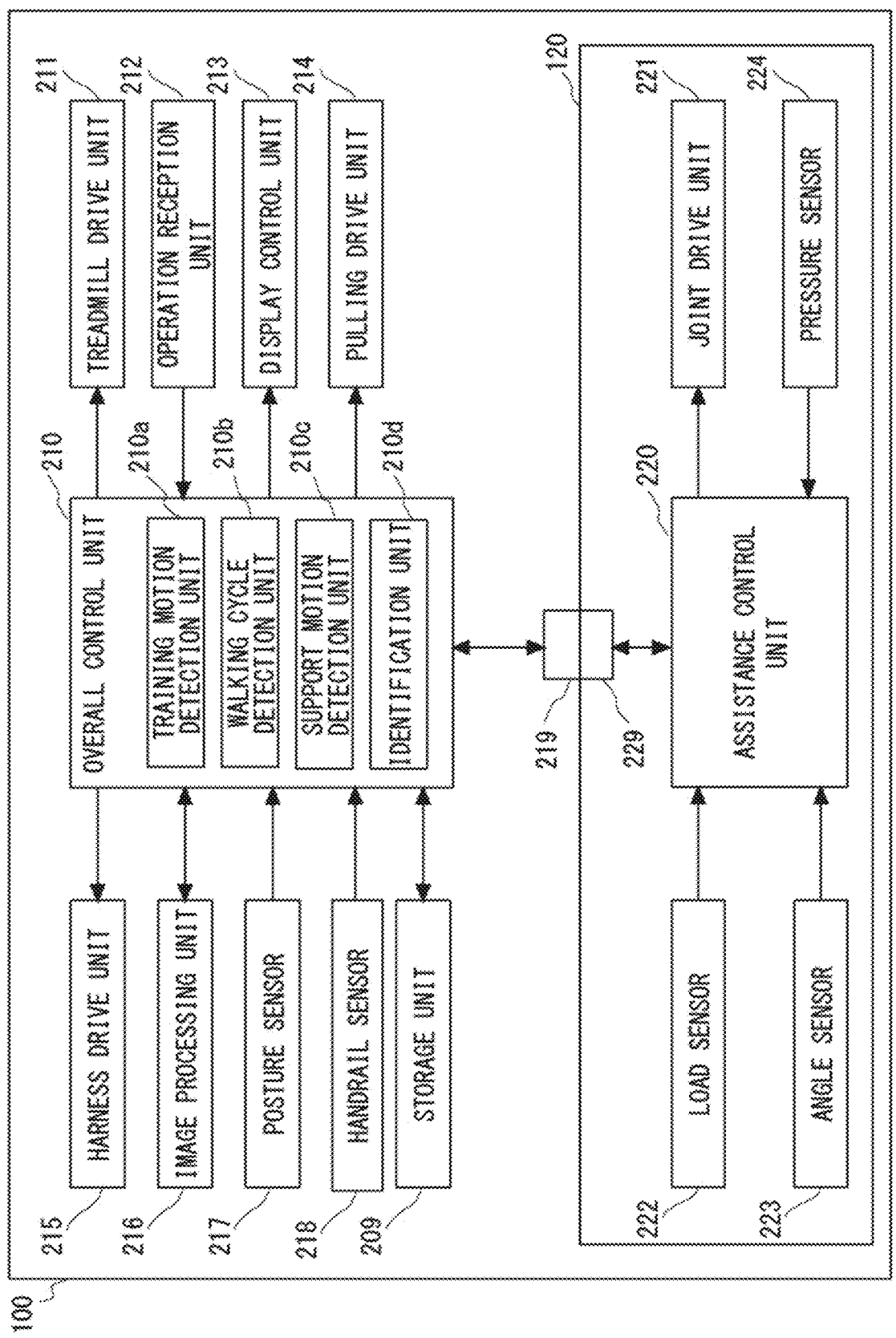
FIG. 3 is a block diagram showing a system configuration of the walking training apparatus.

Next, an example of a system configuration of the walking training apparatus 100 will be described with reference to FIG. 3. FIG. 3 is a block diagram showing an example of a system configuration of the walking training apparatus 100. As shown in FIG. 3, the walking training apparatus 100 may include an overall control unit 210, a treadmill drive unit 211, an operation reception unit 212, a display control unit 213, and a pulling drive unit 214. Further, the walking training apparatus 100 may include a harness drive unit 215, an image processing unit 216, a posture sensor 217, a handrail sensor 218, a communication connection IF (interface) 219, an input and output unit 231, and a walking assistance apparatus 120.

The overall control unit 210 is, for example, an MPU (Micro Processing Unit) and controls the overall operations of the apparatus by executing a control program loaded from a system memory. The overall control unit 210 evaluates whether the walking motion of the trainee 900 is abnormal or not by using, for example, data acquired from various sensors. The overall control unit 210 determines a training result of a series of walking trainings based on, for example, a cumulative number of the abnormal walking. The overall control unit 210 can generate, as part of the rehabilitation data, a result of this determination or the cumulative number of the abnormal walking, based on which the determination result has been obtained. The overall control unit 210 includes a training motion detection unit 210a, a walking cycle detection unit 210b, and a support motion detection unit 210c, and an identification unit 210d.

The training motion detection unit 210a detects a training motion. The training motion is a motion during training of the trainee 900. The training motion can be detected from outputs of sensors for detecting operations of various harnesses attached to the trainee 900.

The walking cycle detection unit 210b detects a walking cycle of a trainee 900 under training. The walking cycle detection unit 210b determines, for example, whether the sole of the diseased leg is in contact with the treadmill 131, or whether it is a stance phase in which the sole is in contact with the treadmill 131 or in a swing phase in which the sole is not in contact with the treadmill 131, from data acquired from the load sensor 222 of the walking assistance apparatus 120. The walking cycle detection unit 210b detects a walking pattern of the trainee 900. The details of the walking cycle will be described later. The walking cycle detection unit 210b may recognize the trainee from an image of the trainee 900's body captured by the camera 140 in place of the data acquired from the load sensor 222, and detect a walking pattern from the recognized image of the trainee 900. The walking cycle detection unit 210b may detect a walking pattern from data generated by the load sensor 222 or the angle sensor 223 included in the walking assistance apparatus 120, instead of using the above-described means.

The support motion detection unit 210c detects at least one of the timing, position, direction, and strength of a support motion received by the trainee 900 from the training staff member 901 in the training motion. The support motion is, for example, a motion in which the training staff member 901 touches a part of the trainee 900's body to prompt the trainee 900 to perform a motion in a specific direction for the purpose of bringing the trainee 900's motion close to a correct motion in the walking training. For example, in walking training performed by a trainee with hemiplegia, his/her diseased leg may swing out beyond a normal range (such walking will be referred to as circumduction walking) during the swing phase. In such a case, the training staff member 901 prompts the trainee not to swing his/her diseased leg outward by touching the outside of the diseased leg.

The identification unit 210d identifies the support motion for the training motion based on a motion pattern of the training motion. That is, the identification unit 210d detects a timing of the training motion and the support motion, and identifies the support motion in association with the walking cycle of the trainee 900.

The treadmill drive unit 211 includes a motor that rotates the belt 132 and its drive circuit. The overall control unit 210 controls the rotation of the belt 132 by sending a drive signal to the treadmill drive unit 211. The overall control unit 210 adjusts, for example, the rotational speed of the belt 132 according to a walking speed set by the training staff member 901.

The operation reception unit 212 receives an input operation from the training staff member 901 and transmits an operation signal to the overall control unit 210. The training staff member 901 operates operation buttons provided in the apparatus, a touch panel disposed over the management monitor 139, an accessory remote controller, etc., which constitute the operation reception unit 212. By the above-described operation, the training staff member can turn on/off the power, provide an instruction to start training, enter a numerical value for the setting, and select a menu item. Note that the operation reception unit 212 can also receive an input operation from the trainee 900.

The display control unit 213 receives a display signal from the overall control unit 210, generates a display image, and displays the generated display image on the training monitor 138 or the management monitor 139. The display control unit 213 generates an image showing progress of the training and a real-time video image shot by the camera 140.

The pulling drive unit 214 includes a motor for pulling the front wire 134 and its drive circuit, which constitute the front pulling unit 135, and a motor for pulling the rear wire 136 and its drive circuit, which constitute the rear pulling unit 137. The overall control unit 210 controls winding of the front wire 134 and winding of the rear wire 136 by sending a drive signal(s) to the pulling drive unit 214. Further, the pulling force of each wire is controlled by controlling the driving torque of the respective motor in addition to controlling the winding operation. The overall control unit 210 identifies (i.e., determines), for example, a timing at which the diseased leg changes from a stance state to a swing state from the result of the detection by the load sensor 222, and assists the swinging action of the diseased leg by increasing or decreasing the pulling force of each wire in synchronization with the identified timing.

The harness drive unit 215 includes a motor for pulling the harness wire 111 and its drive circuit, which constitute the harness pulling unit 112. The overall control unit 210 controls winding of the harness wire 111 and the pulling force of the harness wire 111 by sending a drive signal(s) to the harness drive unit 215. For example, when the overall control unit 210 predicts that the trainee 900 will fall down, it prevents the trainee from falling down by winding the harness wire 111 by a certain length.

The image processing unit 216 is connected to the camera 140, so that it can receive an image signal from the camera 140. The image processing unit 216 receives an image signal from the camera 140 according to an instruction from the overall control unit 210, and generates image data by performing image processing on the received image signal. Further, the image processing unit 216 can also perform a specific image analysis by performing image processing on the image signal received from the camera 140 according to an instruction from the overall control unit 210. For example, the image processing unit 216 detects the position of the foot of the diseased leg at which the foot is in contact with the treadmill 131 (i.e., a stance position) by the image analysis. Specifically, for example, the image processing unit 216 extracts an image area near the tip of the sole frame 124, and calculates the stance position by analyzing an identification marker drawn on a part of the belt 132 where the tip of the sole frame 124 is located.

The posture sensor 217 detects an inclination angle of the abdomen of the trainee 900 with respect to the direction of gravity as described above, and transmits a detection signal to the overall control unit 210. The overall control unit 210 calculates the posture of the trainee 900, in particular, an inclination angle of his/her trunk by using the detection signal from the posture sensor 217. Note that the overall control unit 210 and the posture sensor 217 may be connected to each other through a cable or through short-range wireless communication.

The handrail sensor 218 detects a load (e.g., a pressure) applied to the handrail 130a. That is, the amount of the load corresponding to the part of the trainee's own weight that the trainee 900 cannot support by both legs is applied to the handrails 130a. The handrail sensor 218 detects this load and transmits a detection signal to the overall control unit 210.

The storage unit 209 is a storage device including a non-volatile memory such as a flash memory, an SSD (Solid State Drive), or an HDD (Hard Disc Drive), and stores the identified support motion and the like.

The communication connection IF 219 is an interface connected to the overall control unit 210, and is an interface for providing an instruction to the walking assistance apparatus 120 attached to the diseased leg of the trainee 900 and receiving sensor information therefrom.

The walking assistance apparatus 120 may include a communication connection IF 229 that is connected to the communication connection IF 219 through a cable or wirelessly. The communication connection IF 229 is connected to the assistance control unit 220 of the walking assistance apparatus 120. The communication connection IFs 219 and 229 are communication interfaces in conformity with communication standards, such as those of a wired LAN or a wireless LAN.

Further, the walking assistance apparatus 120 may include an assistance control unit 220, a joint drive unit 221, a load sensor 222, and an angle sensor 223. The assistance control unit 220 is, for example, an MPU and controls the walking assistance apparatus 120 by executing a control program supplied from the overall control unit 210. Further, the assistance control unit 210 notifies the overall control unit 220 of the state of the walking assistance apparatus 120 through the communication connection IFs 229 and 219. Further, the assistance control unit 220 performs control of walking assistance apparatus 120, such as the start/stop thereof, in response to a command from the overall control unit 210.

The joint drive unit 221 includes the motor 121M of the control unit 121 and its drive circuit. The assistance control unit 220 sends a drive signal to the joint drive unit 221 to force the upper-leg frame 122 and the lower-leg frame 123 to open relative to each other around the hinge axis $H_a$ or force them to close relative to each other. Through the above-described operations, the assistance control unit 220 assists an extending motion and a flexing motion of the knee and prevents the knee from buckling.

The load sensor 222 detects the magnitude and the distribution of the vertical load (e.g., the vertical pressure) applied to the sole of the trainee 900 and transmits a detection signal to the assistance control unit 220 as described above. The assistance control unit 220 can receive and analyze the detection signal, and thereby determines the swing/stance state.

The angle sensor 223 detects the angle between the upper-leg frame 122 and the lower-leg frame 123 around the hinge axis $H_a$ and transmits a detection signal to the assistance control unit 220 as described above. The assistance control unit 220 receives this detection signal and calculates the open angle of the knee joint.

The pressure sensor 224 is a sheet-like pressure sensor attached to the trainee 900's body. By the pressure sensor 224, it is possible for the walking training apparatus 100 to detect which part of the trainee 900 has been touched and by how much strength it has been touched.

Figure 4:
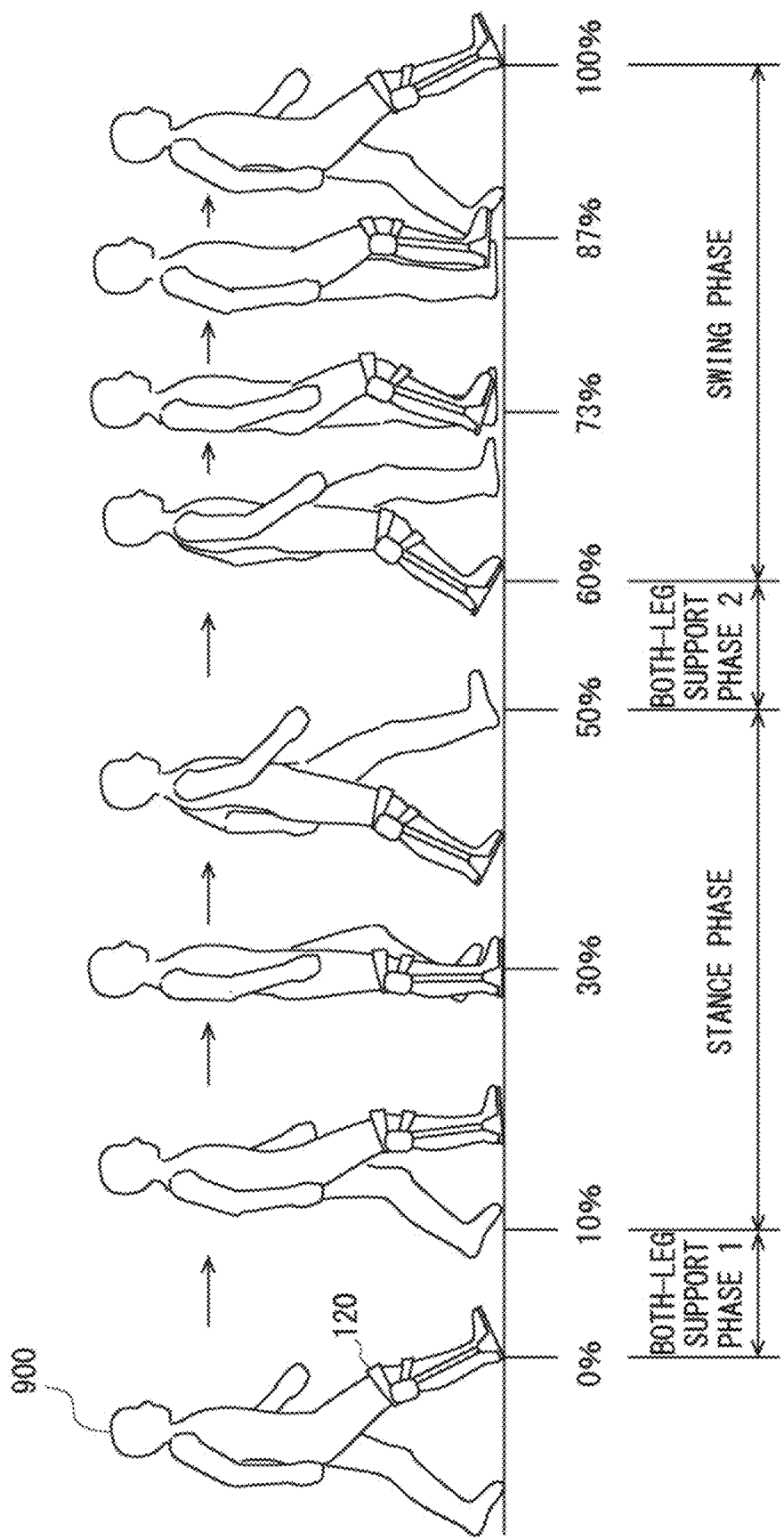
FIG. 4 shows an example of a walking cycle of a trainee.

Next, the walking cycle of the trainee 900 will be described with reference to FIG. 4. FIG. 4 shows an example of the walking cycle of the trainee. FIG. 4 shows a walking trajectory for one cycle focusing on the right leg, which is the diseased leg of the trainee 900 walking from left to right. The walking trajectory is shown as 0% at a position where the right leg comes into contact with the floor surface, and 100% at a position where the right leg has walked for one cycle.

A walking cycle of one cycle is classified into 0 to 10% both-leg support phase 1, 10 to 50% stance phase, 50 to 60% both-leg support phase 2, and 60 to 100% swing phase. The both-leg support phase 1 is an initial stance phase, and the left leg, which is the leg opposite to the right leg, is also in contact with the floor surface. In the stance phase, the right leg (diseased leg), which is the leg of interest, comes into contact with the floor surface, and the left leg, which is the leg opposite to the right leg, is away from the floor surface. The both-leg support phase 2 is a terminal stance phase, and the left leg, which is the leg opposite to the right leg, also comes into contact with the floor surface. In the swing phase, the right leg, which is the leg of interest, is away from the floor surface.

The trainee 900 suffering from paralysis in the right leg may have difficulty supporting his/her weight during the stance phase of the walking cycle shown in the drawing. In such a case, the trainee 900's knee may greatly bend, resulting in "knee buckling". The knee buckling refers to a state in which, as the knee extension function deteriorates, the knee bends, and the trainee 900 cannot maintain the extending of his/her knee, and thus he/she unconsciously bends his/her knee while walking. Further, although the trainee 900 needs to extend his/her knee at the position around 30% of the walking cycle, he/she may not be able to extend his/her knee after bending his/her knee. Thus, the motor 121M of the control unit 121 is driven so as to prevent the knee from excessively bending or assist the knee to extend at a predetermined timing during the stance phase.

Figure 5:
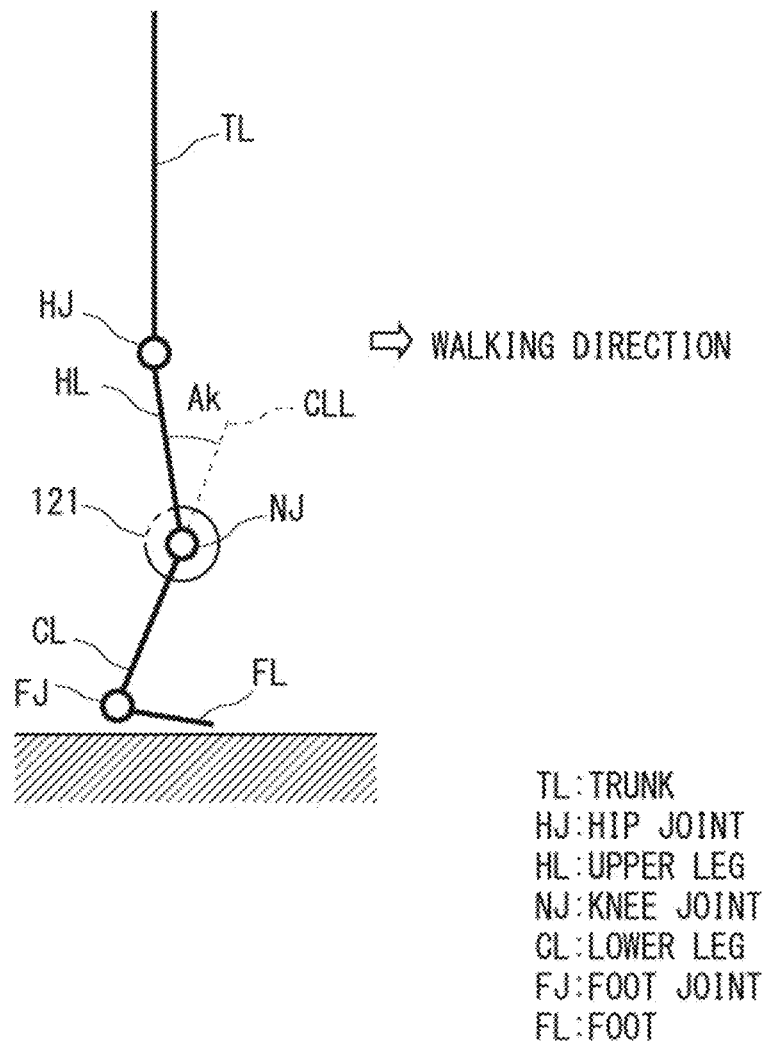
FIG. 5 shows an example of a knee extension angle of a diseased leg.

Next, an angle of the knee joint will be described with reference to FIG. 5. FIG. 5 shows an example of a knee extension angle of the diseased leg. FIG. 5 is a schematic diagram when the paralyzed body part, which is the lower body of the diseased leg, is observed from the side with respect to the walking direction. FIG. 5 shows a trunk TL, a hip joint HJ, an upper leg HL, a knee joint NJ, a lower leg CL, an ankle joint FJ, and a foot FL in order from the top. A lower leg extension line CLL is indicated by a dotted line as an extension line extending the lower leg CL upward. An angle between the upper leg HL and the lower leg extension line CLL is shown as a knee extension angle Ak. In the schematic diagram of FIG. 5, the diseased leg of the trainee 900 is in the stance phase and is in contact with the floor surface.

The knee extension angle Ak of a healthy subject in the stance phase shown in the drawing is 10 to 15 degrees. Thus, the maximum knee extension angle Ak in the stance phase may be about 10 to 15 degrees even for the trainee 900 when he/she walks. However, when the trainee 900 cannot support his/her weight, the knee extension angle Ak may become much greater than 15. Thus, the motor 121M of the control unit 121 attached to the knee joint NJ is driven in a direction to return the knee extension angle Ak to within a predetermined range when the knee extension angle A exceeds a preset value.

Figure 6:
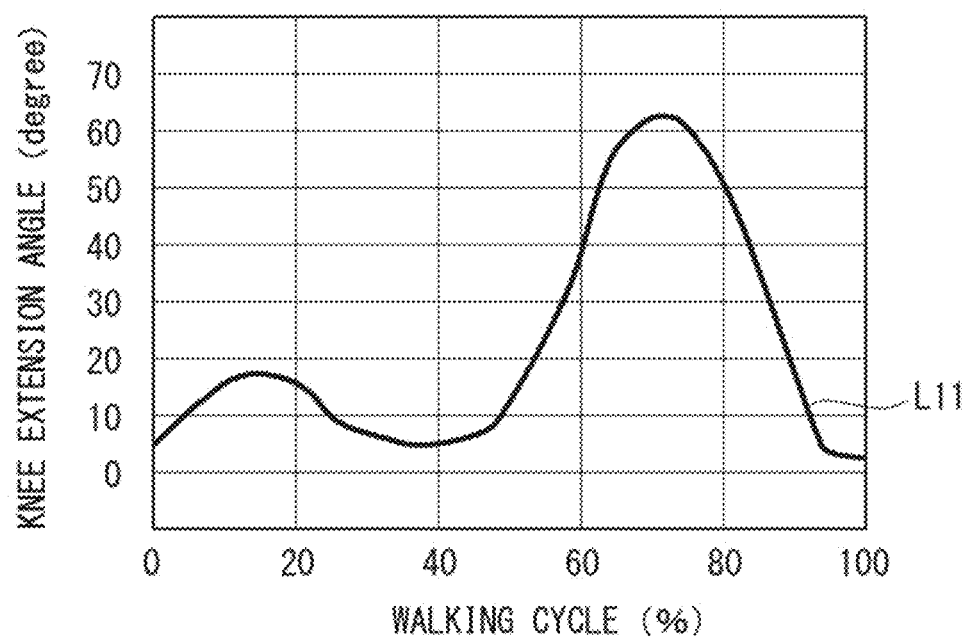
FIG. 6 shows a relationship between a knee extension angle and a walking cycle.

Next, an example of a principle for detecting a walking cycle using the knee extension angle Ak will be described with reference to FIG. 6. FIG. 6 shows a relationship between the walking cycle and the knee extension angle. In the graph of FIG. 6, the horizontal axis represents the walking cycle, and the vertical axis represents the knee extension angle. A curve L11 plotted as the solid line in the graph is a walking trajectory showing a change in the knee extension angle Ak of the trainee 900 in walking training that has been performed normally.

As shown in the drawing, the knee joint is extended and flexed twice during a walking cycle. The trainee 900's leg makes an initial contact with the treadmill with a bending position of about 5 degrees at a walking cycle of 0%, and then the leg is flexed to about 15 degrees before the leg is extended. The trainee 900's leg is then extended almost completely till 40% of the walking cycle, and then begins to be flexed again. Maximum flexion occurs at the beginning of a mid-swing phase (around 70% of walking cycle), when the knee extension angle Ak is about 60 degrees. From the mid-swing phase onward, the trainee 900's leg is extended to an almost complete extension position (knee extension angle Ak is around 0 degrees) for the next initial contact with the treadmill.

While the training is performed normally, the trainee 900's leg repeats the pattern shown as the curve L11. The angle sensor 223 recognizes the walking cycle by detecting the knee extension angle Ak during training at predetermined intervals. The data of the walking cycle shown as the curve L11 may be generated by calculating a statistical value such as an average value from the data of a plurality of walking cycles.

As described above, the walking training apparatus 100 can detect the walking cycle, for example, by acquiring the knee extension angle Ak at predetermined intervals. The knee extension angle Ak is one of the training motions performed by the trainee 900. That is, the walking training apparatus 100 acquires a training motion related to swinging of a knee by acquiring the knee extension angle Ak. The walking training apparatus 100 may acquire desired data from other sensor outputs as other training motions. For example, the walking training apparatus 100 can acquire data about the posture of the trainee 900 from an image of the trainee 900 captured by the camera 140. Further, the walking training apparatus 100 can acquire data about a shift in the center of gravity of the diseased leg of the trainee 900 from the load sensor 222. The walking training apparatus 100 can acquire such data, for example, in association with the walking cycle detected from the knee extension angle Ak.

Figure 7:
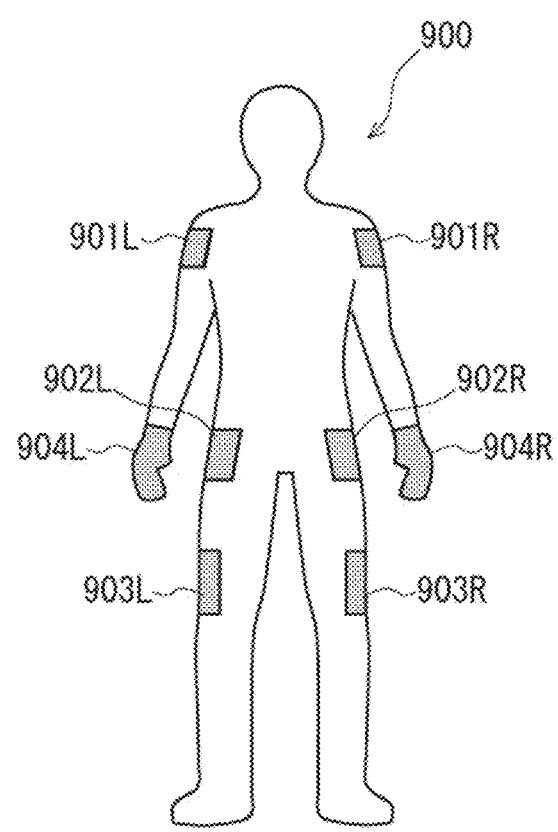
FIG. 7 shows an example of a pressure sensor.

Next, an example of detecting a support motion will be described. FIG. 7 shows an example of pressure sensors. In order to detect a support motion, the trainee 900 attaches the pressure sensors, such as the ones shown in the drawing, to himself/herself. A sensor 901L is attached to the trainee 900's left shoulder and detects how hard the training staff member 901 has touched the trainee 900's left shoulder. A sensor 901R is attached to the trainee 900's right shoulder and detects how hard the training staff member 901 has touched the trainee 900's right shoulder, in a manner similar to that in the case of the sensor 901L. A sensor 902L is attached to the trainee 900's left waist, the sensor 902R is attached to the trainee 900's right waist, a sensor 903L is attached to the trainee 900's left upper leg, and the sensor 903R is attached to the trainee 900's right upper leg.

Sensors 904L and 904R are also attached to the trainee 900's hands. Sensors 904L and 904R detect that the trainee 900 has grasped something or that the trainee 900 has leaned on something.

Figure 8:
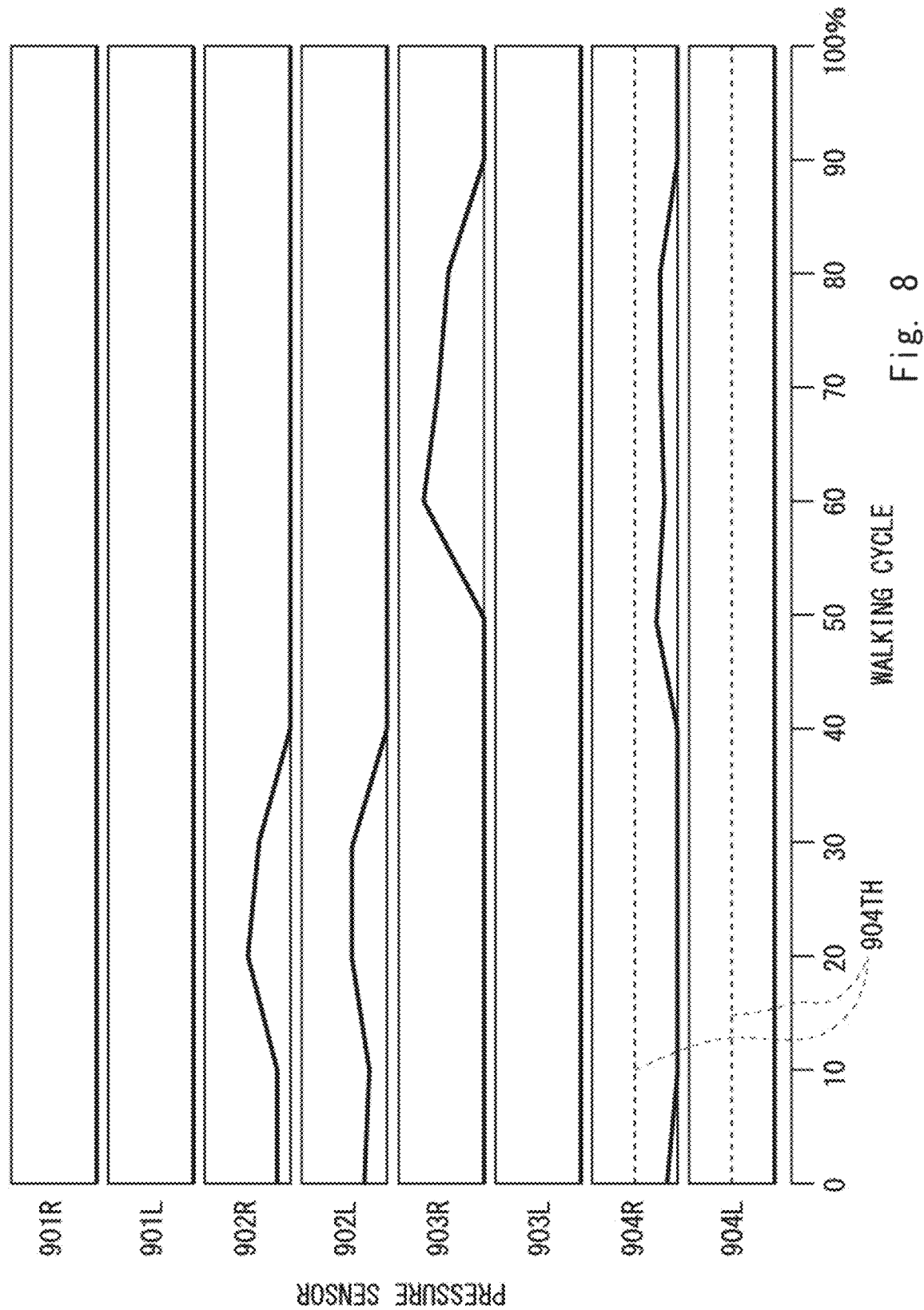
FIG. 8 shows a relationship between an output of the pressure sensor and the walking cycle.

Next, a principle of detecting the support motion will be described with reference to FIG. 8. FIG. 8 shows a relationship between outputs of the pressure sensors and the walking cycle. The horizontal axis at the bottom of the drawing represents the walking cycle. In FIG. 8, a belt-like frame extending along the horizontal axis indicates the strength of pressure received by each of the pressure sensors attached to the trainee 900 along the walking cycle. In FIG. 8, the data of the sensor 901R is plotted on the top row, and the data of the sensors 901L, 902R, 902L, 903 R, 903L, 904R, and 904L is plotted in order from the second row. The bottom part of the belt-like frame indicates that the pressure received by the pressure sensor is zero. When the pressure sensor receives pressure at a predetermined timing, the data of the corresponding pressure sensor is plotted in such a way that a broken line is extended obliquely upward from the bottom part.

In the drawing, the sensors 901R, 901L, 903L, and 904L have not received pressure. The pressure applied to the sensors 902R and 902L increases from 10% to 20% of the walking cycle, stays almost flat from 20% to 30% of the walking cycle, decreases from 30% to 40% of the walking cycle, and becomes 0 at 40% of the walking cycle. This indicates that the trainee 900's left and right waist parts have received pressure from the initial stage when the diseased leg has been brought into contact with the treadmill until the initial stance phase in which the knee is flexed to some extent. That is, the drawing shows that the trainee 900's waist is supported by the training staff member 901 in the initial stance phase of the walking training.

Next, the pressure applied to the sensor 903R increases from 50% to 60% of the walking cycle, gradually decreases from 60% to 90% of the walking cycle, and becomes 0 at 90% of the walking cycle. This indicates that the trainee 900 has received an instruction from the training staff member 901 so as to prevent circumduction walking in which the diseased leg swings outward in the swing phase.

The pressure applied to the sensor 904R gradually increases from 40% to 50% of the walking cycle, then stays almost flat from 50% to 80% of the walking cycle, and becomes 0 at 90% of the walking cycle. This indicates that the trainee has grasped the handrail sensor 218 during the swing phase of the diseased leg.

The dotted line shown in a frame indicating the pressure of the sensors 904R and 904L is a threshold 904TH. When the pressure of the sensors 904R and 904L exceeds the threshold 904TH, it indicates that the trainee 900 has strongly grasped the handrail sensor 218. That is, in this case, it means that there is a possibility that the trainee 900 has rested his/her weight on the handrail sensor 218. In this embodiment, the walking training apparatus 100 is configured to regard the state in which the trainee 900 rests his/her weight on the handrail or the like as not being a normal state as a training in the walking training. Thus, the walking training apparatus 100 is configured not to measure a support motion (not identified as a support motion) when the pressure of the sensors 904R and 904L exceeds the threshold 904TH. More specifically, in this case, the identification unit 210d identifies a support motion by associating whether the pressure of the sensors 904R and 904L exceeds the threshold 904TH with the support motion.

In the configuration in which a support motion is not identified, for example, a load applied to the handrail sensor 218 may be used instead of using the sensors 904L and 904R. That is, in this case, when the handrail sensor 218 receives a load exceeding a preset value, the overall control unit 210 detects this load, thereby not identifying a support motion. Alternatively, when the handrail sensor 218 receives a load exceeding the preset value, the overall control unit 210 detects this load, thereby performing a process such as adding a predetermined flag to a support motion.

Figure 9:
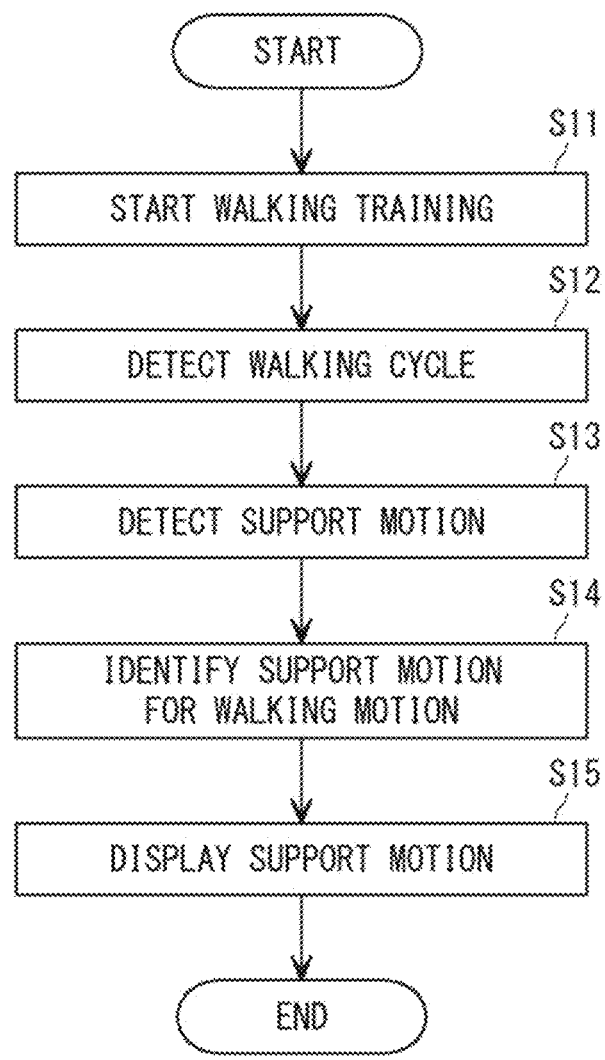
FIG. 9 is a flowchart showing processing of a walking training apparatus 100 according to an embodiment.

Next, a process for measuring a support motion performed by the walking training apparatus 100 will be described with reference to FIG. 9. FIG. 9 is a flowchart showing the process of the walking training apparatus 100 according to the embodiment. The flowchart of FIG. 9 shows the process performed by the overall control unit 210. An example of FIG. 9 shows a case in which the support motion measured by the overall control unit 210 is displayed on the management monitor 139 serving as a display unit.

First, the overall control unit 210 performs a process for starting the walking training (step S11). When walking training is started, the trainee 900 walks on the treadmill 131. Next, the walking cycle detection unit 210b of the overall control unit 210 detects a walking cycle (step S12). Specifically, for example, as described with reference to FIG. 6, the sensor output of the knee extension angle Ak is acquired to detect the walking cycle.

Next, the support motion detection unit 210c detects a support motion (step S13). Specifically, as shown in FIG. 8, the support motion detection unit 210c acquires values of the pressure sensors.

Next, the identification unit 210d identifies the support motion for the walking motion (step S14). The identification unit 210d associates values of the pressure sensors acquired by the support motion detection unit 210c with the walking cycle detected by the walking cycle detection unit 210b, and identifies how the support motion is performed along the walking cycle.

Figure 10:
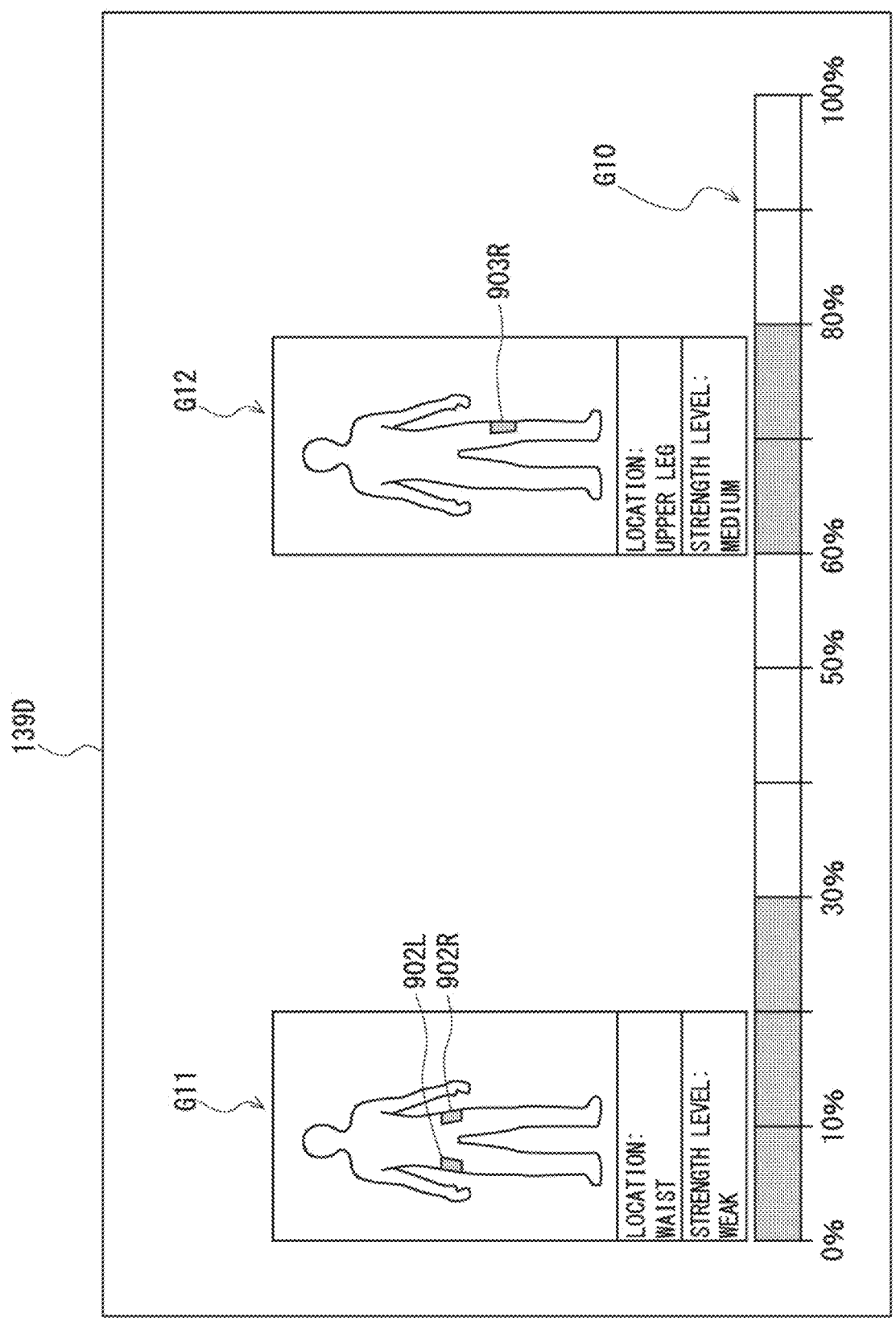
FIG. 10 shows an example of displaying a measured support motion.

Next, the overall control unit 210 performs a process for displaying the support motion identified by the identification unit 210d (step S15). FIG. 10 shows an example of a support motion displayed on the management monitor 139. FIG. 10 shows an example of displaying the measured support motion. A screen 139D shown in the drawing shows a part of the display of the management monitor 139. A walking cycle G10 is shown in a belt-like shape at a lower part of the screen 139D.

A band-like part of 0% to 30% of the walking cycle G10 is highlighted in gray, and a display G11 indicating a support motion is shown above the highlighted part. The sensors 902L and 902R are displayed on the display G11 together with a schematic diagram showing the trainee 900. Further, an explanation "Location: waist" "Strength level: weak" is added below the schematic diagram showing the trainee 900. The above display means that the trainee 900's right and left waist parts are supported in the support motion by a weak force from 0% to 30% of the walking cycle, which is the initial stance stage.

Likewise, 60% to 80% of the walking cycle G10 is highlighted in gray, and a display G12 indicating a support motion is shown above the highlighted part. The sensor 903R is displayed on the display G12 together with a schematic diagram showing the trainee 900. Further, an explanation "Location: upper leg" "Strength level: medium" is added below the schematic diagram showing the trainee 900. The above display means that the trainee 900's right upper leg is supported with a medium force from 60% to 80% of the walking cycle, which the initial swing phase, as a support motion.

As described above, according to the above-described embodiment, a support motion can be objectively measured, and the measured support motion can be presented to the training staff member or the like. That is, the management monitor 139 is a presentation unit that presents the support motion identified by the identification unit 210d to the training staff member along the walking cycle. The support motion detection unit 210c can use, for example, image data acquired from the camera 140 instead of the above-described pressure sensors. As for the camera 140, one of or both of the main camera 140A and the sub-camera 140B may be used. The number of cameras 140 may be three or more.

The process for identifying a support motion performed by the identification unit 210d may identify a support motion for one walking cycle. Thus, the walking training apparatus 100 can dynamically identify a support motion.

The process for identifying a support motion performed by the identification unit 210d may identify a support motion for a plurality of walking cycles and perform a predetermined statistical process (calculating average, maximum, minimum, moving average, etc.). In this case, the overall control unit 210 may further include a statistical value calculation unit for calculating a statistical value of a support motion based on a motion timing.

The support motion detection unit 210c may detect a support motion by machine-learning the image acquired from the camera 140. In this case, the support motion detection unit 210c may generate a trained model using teacher data in advance. Further, when the machine learning is used, the walking training apparatus 100 may recognize the posture of the trainee 900 from the image data instead of the sensor 904L, the sensor 904R, and the handrail sensor 218, and determine whether it is suitable to identify a motion as a support motion.

Figure 11:
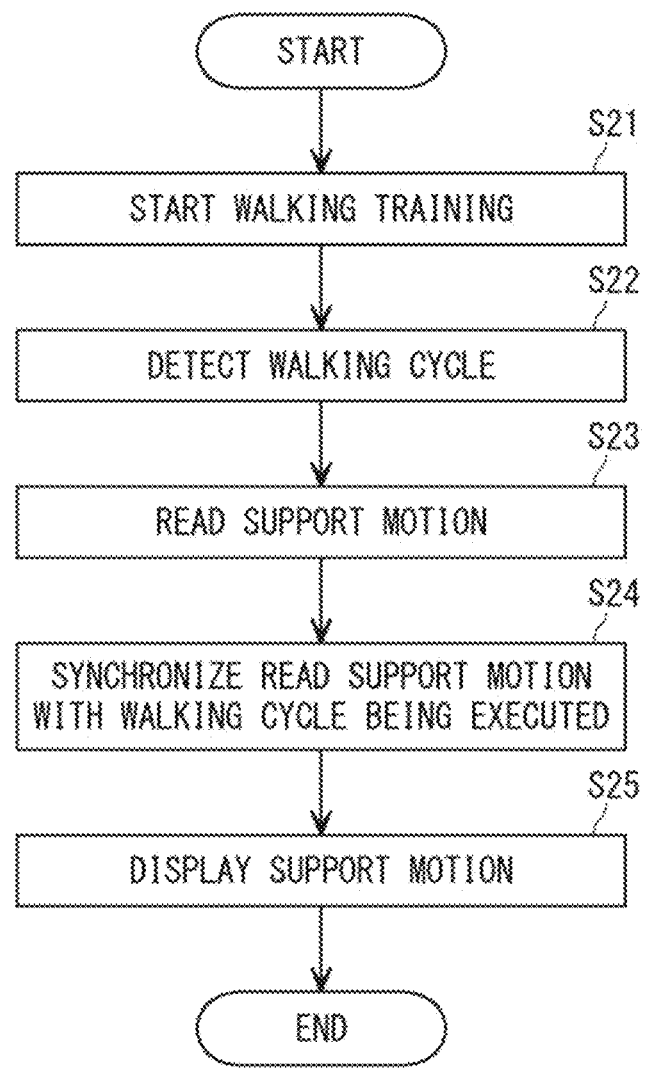
FIG. 11 is a flowchart showing processing for associating a measured support motion with a training motion being executed.

Next, a process for superimposing a measured support motion on the training motion under training will be described with reference to FIGS. 11 and 12. FIG. 11 is a flowchart showing a process for associating a measured support motion with a training motion being executed. An example shown in the drawing is a process in which a support motion measured in the walking training performed in the past is previously stored in the storage unit 209, and the stored support motion is superimposed on the training motion being executed.

First, the overall control unit 210 performs a process for starting walking training (step S21). When walking training is started, the trainee 900 walks on the treadmill 131. Next, the walking cycle detection unit 210b of the overall control unit 210 detects a walking cycle (step S22). Specifically, for example, as described with reference to FIG. 6, the sensor output of the knee extension angle Ak is acquired to detect the walking cycle.

Next, the overall control unit 210 reads the support motion stored in the storage unit 209 (step S23). Next, the overall control unit 210 performs a process for synchronizing the walking cycle in order to superimpose the read support motion on the walking training being executed (step S24).

Next, the overall control unit 210 displays the synchronized support motion in accordance with a timing of the walking cycle of the walking training being executed (step S25).

Figure 12:
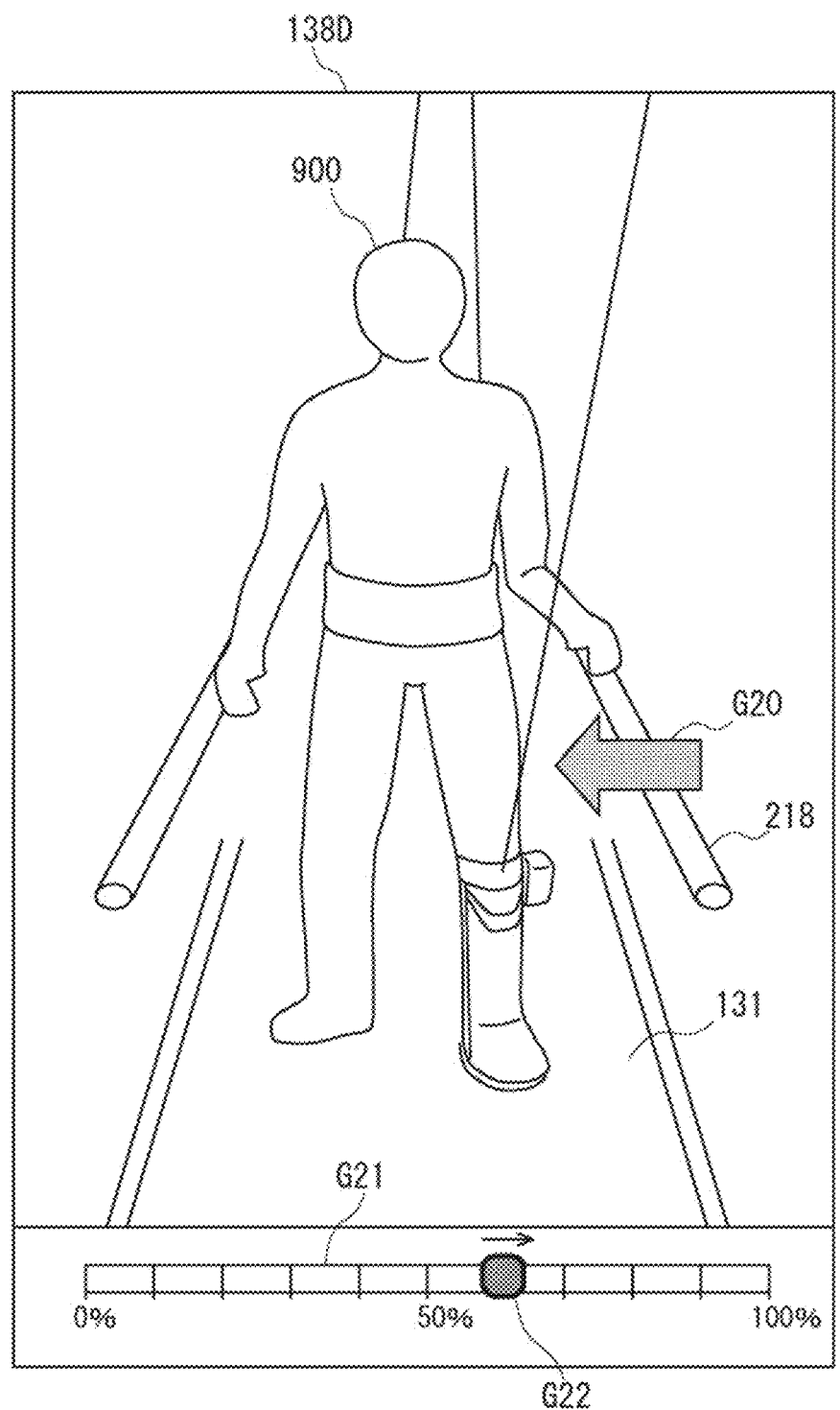
FIG. 12 shows an example in which a measured support motion is superimposed on a training being executed.

FIG. 12 shows an example in which the measured support motion is superimposed on the training being executed. An image 138D shown in the drawing shows an example of an image displayed on the training monitor 138. A walking cycle G21 is displayed in a belt-like shape on the lower part of the image 138D. A progress sign G22 indicating a timing of walking for the trainee 900 during training under execution is shown while moving rightward on the walking cycle G21. The progress sign G22 is displayed from 60% to 70% of the walking cycle G21. Thus, the image 138D shown in the drawing indicates that the training motion of the trainee 900 is in a state of the walking cycle of 60% to 70%. The progress mark G22 shifts to the right over time, and when it reaches 100%, it is displayed above 0%, and shifts to the right therefrom along the walking motion of the trainee 900.

The image 138D shows the trainee 900 walking on the treadmill 131. The displayed image is an image of the trainee 900 captured by the main camera 140A. An arrow icon G20 is displayed near the trainee 900's right upper leg displayed in the image 138D. The arrow icon G20 is superposed on the image of the trainee 900 by the overall control unit 210 and indicates a support motion read from the storage unit 209. That is, in the support motion stored in the memory unit 209, the upper leg of the diseased leg is supported from 60% to 70% of the walking cycle. Note that the direction of the arrow of the arrow icon G20 indicates the direction of the support motion. The size of the arrow of the arrow icon G20 indicates the strength of the support motion.

By superimposing the support motion measured in the past on the training being executed in this manner, the training staff member 901 supporting the training being executed can perform the support motion while referring to the support motion measured in the past. Thus, for example, a less experienced training staff member can perform a support motion while support motions performed by a skilled training staff member is superimposed on the screen.

That is, the training monitor 138 is a presentation unit for presenting a support motion identified by the identification unit 210*d* to the trainee or the training staff member along the walking cycle.

Note that the shape and size of the arrow of the arrow icon G20 are only examples, and the shape, size, color, movement, and the like of the arrow of the arrow icon G20 can indicate a support motion in various forms.

Although the embodiment has been described above, the walking training apparatus 100 according to the embodiment is not limited to the above-described configuration. For example, the walking training apparatus 100 may include a communication unit that can communicate with an external server, and may cooperate with the server by communicating with the server to perform part of the information process performed by the overall control unit 210 of the walking training apparatus 100. In this case, for example, the walking training apparatus 100 outputs a signal related to a walking cycle and a signal related to a support motion to the server, and the server recognizes the support motion from the received signal and transmits the recognized result to the walking training apparatus 100. According to the above-described embodiment, it is possible to provide a support motion measurement system or the like for reducing variations in support motions.

Note that the learning apparatus and the rehabilitation support system described above can be applied to a system for performing an assistance operation of the ankle or hip joint of the trainee in place of or in addition to the assist operation of the knee joint of the trainee. The learning apparatus and the rehabilitation support system described above can also be applied to a rehabilitation support system for training the movement of the arm instead of walking training.

The above-described program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (Random Access Memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

The present disclosure is not limited to the above-described embodiment, and can be appropriately changed without departing from the scope thereof. For example, the above-described walking training apparatus may be an apparatus that trains motions of the trainee's hip joint or ankle in addition to or instead of a motion of the trainee's knee joint. Further, the above walking training apparatus may be applied to a rehabilitation support apparatus or a rehabilitation support system that train a motion of the trainee's arm.

From the disclosure thus described, it will be obvious that the embodiment of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A support motion operation measurement system for measuring a support motion performed for a training motion of a trainee by a training staff member assisting the trainee to perform training of a preset motion, the support motion measurement system comprising:
   a training motion detection unit configured to detect the training motion;
   a support motion detection unit configured to detect at least one of a timing, a position, a direction and strength of the support motion received by the trainee from the training staff member in the training motion; and
   an identification unit configured to identify the support motion for the training motion based on a motion pattern of the training motion.

2. The support motion measurement system according to claim 1, wherein
   the training motion detection unit comprises an image pickup unit configured to capture an image of the trainee's body.

3. The support motion measurement system according to claim 1, wherein
   the training motion detection unit comprises an angle sensor attached to the trainee's body and configured to detect an angle of a joint of the trainee.

4. The support motion measurement system according to claim 1, wherein
   the training motion detection unit comprises a pressure sensor attached to a part of the trainee's body and configured to detect at least one of a direction and strength of a force applied to the attached part.

5. The support motion measurement system according to claim 1, wherein
   the support motion detection unit comprises an image pickup unit configured to capture an image of the training staff member's body.

6. The support motion measurement system according to claim 1, wherein
   the support motion detection unit comprises a pressure sensor attached to the trainee's body.

7. The support motion measurement system according to claim 1, wherein
   the identification unit is configured to identify the support motion based on a preset motion timing in the training motion, and
   the support motion measurement system further comprises a statistical value calculation unit configured to calculate a statistical value of the support motion identified by the identification unit based on the motion timing.

8. The support motion measurement system according to claim 1, wherein
   the training motion detection unit is configured to detect the training motion in a walking motion performed by the trainee.

9. The support motion measurement system according to claim 8, wherein
   the identification unit is configured to identify a change in the support motion according to a walking cycle that is the motion pattern of the walking motion.

10. The support motion measurement system according to claim 8, further comprising:
    a support member for supporting at least a part of the trainee's upper body, wherein the identification unit is configured to associate whether or not the support member is supporting the trainee's upper body with the support motion and to identify the support motion based on the motion pattern.

11. The support motion measurement system according to claim 8, further comprising:
a support member for supporting at least a part of the trainee's upper body, wherein
the identification unit is configured not to identify the support motion based on the motion pattern when the support member is supporting the trainee's upper body.

12. The support motion measurement system according to claim 1, further comprising:
a presentation unit configured to present the support motion identified by the identified unit to the trainee or the training staff member along the motion pattern.

13. A rehabilitation support system comprising at least:
the support motion measurement system according to claim 12; and
a drive unit configured to support training of a motion performed by the trainee, wherein
the presentation unit is configured to associate the state of the training performed by driving the drive unit with the motion pattern and to present a change in the support motion.

14. A support motion measurement method for measuring a support motion performed for a training motion of a trainee by a training staff member assisting the trainee to perform training of a preset motion, the support motion measurement method comprising:
detecting the training motion;
detecting at least one of a timing, a position, a direction and strength of the support motion received by the trainee from the training staff member in the training motion; and
identifying a change in the support motion in the training motion according to a motion pattern of the training motion.

15. A non-transitory computer readable medium storing a program for causing a computer to execute a support motion measurement method for measuring a support motion performed for a training motion of a trainee by a training staff member assisting the trainee to perform training of a preset motion, the support motion measurement method comprising:
detecting the training motion;
detecting at least one of a timing, a position, a direction and strength of the support motion received by the trainee from the training staff member in the training motion; and
identifying a change in the support motion in the training motion according to a motion pattern of the training motion.

\* \* \* \* \*